United States Patent
Teraoka et al.

(10) Patent No.: US 10,096,818 B2
(45) Date of Patent: Oct. 9, 2018

(54) ELECTRODE COMPLEX, METHOD OF PRODUCING ELECTRODE COMPLEX, AND LITHIUM BATTERY

(71) Applicant: SEIKO EPSON CORPORATION, Tokyo (JP)

(72) Inventors: Tsutomu Teraoka, Matsumoto (JP); Tomofumi Yokoyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 238 days.

(21) Appl. No.: 14/857,094

(22) Filed: Sep. 17, 2015

(65) Prior Publication Data
US 2016/0093875 A1    Mar. 31, 2016

(30) Foreign Application Priority Data

Sep. 30, 2014  (JP) .................. 2014-200018

(51) Int. Cl.
*H01M 10/0562*    (2010.01)
*H01M 4/131*    (2010.01)
(Continued)

(52) U.S. Cl.
CPC ......... *H01M 4/131* (2013.01); *H01M 4/1391* (2013.01); *H01M 4/364* (2013.01);
(Continued)

(58) Field of Classification Search
CPC .. H01M 10/052; H01M 10/0562; H01M 4/13; H01M 4/1391; H01M 4/365;
(Continued)

(56) References Cited

U.S. PATENT DOCUMENTS

| 2004/0096745 A1 | 5/2004 | Shibano et al. |
| 2008/0020283 A1* | 1/2008 | Miyashiro .............. B82Y 30/00 |
| | | 429/322 |

(Continued)

FOREIGN PATENT DOCUMENTS

| JP | H06-290780 A | 10/1994 |
| JP | 2004-179158 A | 6/2004 |

(Continued)

OTHER PUBLICATIONS

Feb. 25, 2016 extended Search Report issued in European Patent Application No. 15187077.1.

*Primary Examiner* — Jimmy Vo
(74) *Attorney, Agent, or Firm* — Oliff PLC

(57) ABSTRACT

An electrode complex includes: a complex which includes a porous active material molded body which is formed by being three-dimensionally connected with a plurality of particulate active material particles containing a lithium double oxide and a plurality of particulate noble metal particles containing a noble metal with a melting point of 1000° C. or higher and includes a communication hole, and a solid electrolyte layer formed on the surface of the active material molded body containing the communication hole of the active material molded body; and a current collector which is provided by being bonded to the active material molded body on one surface of the complex.

18 Claims, 10 Drawing Sheets

(51) Int. Cl.
*H01M 4/525* (2010.01)
*H01M 10/0525* (2010.01)
*H01M 6/00* (2006.01)
*H01M 4/1391* (2010.01)
*H01M 4/36* (2006.01)
*H01M 4/62* (2006.01)
*H01M 10/052* (2010.01)

(52) U.S. Cl.
CPC ............ *H01M 4/366* (2013.01); *H01M 4/525* (2013.01); *H01M 4/62* (2013.01); *H01M 4/626* (2013.01); *H01M 6/00* (2013.01); *H01M 10/052* (2013.01); *H01M 10/0525* (2013.01); *H01M 10/0562* (2013.01); *H01M 2300/0068* (2013.01); *H01M 2300/0071* (2013.01)

(58) Field of Classification Search
CPC ...... H01M 4/131; H01M 4/364; H01M 4/366; H01M 4/525; H01M 4/62; H01M 4/626; H01M 10/0525
See application file for complete search history.

(56) References Cited

U.S. PATENT DOCUMENTS

| | | | |
|---|---|---|---|
| 2010/0216032 A1* | 8/2010 | Baba | H01M 4/366 429/322 |
| 2011/0045355 A1* | 2/2011 | Ichikawa | H01M 4/043 429/231.95 |
| 2014/0080006 A1 | 3/2014 | Ogasa | |
| 2014/0216631 A1 | 8/2014 | Teraoka et al. | |
| 2014/0220436 A1 | 8/2014 | Yokoyama et al. | |

FOREIGN PATENT DOCUMENTS

| | | |
|---|---|---|
| JP | 2006-277997 A | 10/2006 |
| JP | 4615339 B2 | 1/2011 |
| JP | 2014-010981 A | 1/2014 |
| JP | 2014-154236 A | 8/2014 |
| WO | 2013/130983 | 9/2013 |

\* cited by examiner

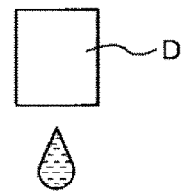

ELECTRODE COMPLEX, METHOD OF PRODUCING ELECTRODE COMPLEX, AND LITHIUM BATTERY

This application claims a priority to Japanese Patent Application No. 2014-200018 filed on Sep. 30, 2014 which is hereby expressly incorporated by reference in its entirety.

BACKGROUND

1. Technical Field

Several aspects of the present invention relate to an electrode complex, a method of producing an electrode complex, and a lithium battery.

2. Related Art

As a power source of various electric devices including a portable information device, a lithium battery (including a primary battery and a secondary battery) has been used. The lithium battery includes a positive electrode and a negative electrode and an electrolyte layer that is provided between the layers of the positive electrode and the negative electrode and mediates conduction of lithium ions.

In recent years, as a lithium battery having high energy density and stability in a balanced manner, an all-solid lithium battery which uses a solid electrolyte as a forming material of an electrolyte layer has been suggested (for example, JP-A-2006-277997, JP-A-2004-179158, and Japanese Patent No. 4615339).

As the all-solid lithium battery, a high-output and high-capacity lithium battery which is stable for a long period of time has been required, but it cannot be said that an all-solid lithium battery in the related art has the above-described characteristics sufficiently.

SUMMARY

An advantage of some aspects of the invention is to provide an electrode complex capable of being used as a lithium battery that stably maintains a high output and high capacity for a long period of time by being applied to a lithium battery, a method of producing an electrode complex capable of producing such an electrode complex, and a lithium battery which includes an electrode complex and is capable of stably maintaining a high output and high capacity for a long period of time.

An electrode complex according to an aspect of the invention includes: a complex which includes a porous active material molded body which is formed by being three-dimensionally connected with a plurality of particulate active material particles containing a lithium double oxide and a plurality of particulate noble metal particles containing a noble metal with a melting point of 1000° C. or higher and includes a communication hole, and a solid electrolyte layer that is formed on the surface of the active material molded body containing the communication hole of the active material molded body and contains a solid electrolyte; and a current collector which is provided by being bonded to the active material molded body on one surface of the complex.

When the electrode complex including the active material molded body having such a configuration is applied to the lithium battery, the lithium battery stably maintains a high output and high capacity for a long period of time.

In the electrode complex according to the aspect of the invention, it is preferable that the noble metal having a melting point of 1000° C. or higher is at least one of palladium and platinum.

Among noble metals, these noble metals are relatively inexpensive and easily handled and have excellent conductivity of lithium ions and electrons. For this reason, when the noble metals are used as a constituent material of the noble metal particles, it is possible to more smoothly perform delivery of electrons between the plurality of active material particles and delivery of lithium ions between the active material particles and the solid electrolyte layer and to stably maintain the state for a long period of time.

In the electrode complex according to the aspect of the invention, it is preferable that the content ratio of the noble metal particles in the active material molded body is in a range of 0.1% by weight to 10% by weight.

With this configuration, it is possible for the noble metal particles to be more reliably adhered to the surface of the active material particles and to be interposed between the active material particles. As a result, it is possible to more smoothly perform delivery of electrons between the plurality of active material particles and delivery of lithium ions between the active material particles and the solid electrolyte layer and to stably maintain the state for a long period of time.

In the electrode complex according to the aspect of the invention, it is preferable that the noble metal particles have an average particle diameter of 0.1 µm to 10 µm.

With this configuration, it is possible for the noble metal particles to be more reliably adhered to the surface of the active material particles and to be interposed between the active material particles. As a result, it is possible to more smoothly perform delivery of electrons between the plurality of active material particles and delivery of lithium ions between the active material particles and the solid electrolyte layer and to stably maintain the state for a long period of time.

In the electrode complex according to the aspect of the invention, it is preferable that the particle diameter of the active material particles is greater than the particle diameter of the noble metal particles.

With this configuration, it is possible for the plurality of noble metal particles to be adhered to the surface of one active material particle. As a result, it is possible to more smoothly perform delivery of electrons between the plurality of active material particles and delivery of lithium ions between the active material particles and the solid electrolyte layer and to stably maintain the state for a long period of time.

In the electrode complex according to the aspect of the invention, it is preferable that both of the active material molded body and the solid electrolyte layer are exposed to one surface of the complex and the solid electrolyte layer is singly exposed to the other surface of the complex.

With this configuration, in the lithium battery to which the electrode complex is applied, connection of the electrode with the current collector through the active material molded body, that is, a short circuit can be prevented.

In the electrode complex according to the aspect of the invention, it is preferable that the lithium double oxide is $LiCoO_2$.

With this configuration, it is possible to reliably obtain the active material molded body formed from the active material particle being sintered and integrated and to reliably prevent deterioration and degradation of the active material particles caused by the noble metal particles being contained.

In the electrode complex according to the aspect of the invention, it is preferable that the inorganic solid electrolyte is $Li_{0.35}La_{0.55}TiO_3$.

When the inorganic solid electrolyte is configured of $Li_{0.35}La_{0.55}TiO_3$, the inorganic solid electrolyte can be reliably generated from a precursor.

A method of producing an electrode complex according to another aspect of the invention includes: heating particulate active material particles which contain a lithium double oxide and particulate noble metal particles which contain a noble metal having a melting point of 1000° C. or higher to obtain a porous active material molded body formed of a porous body having communication holes connected to a plurality of the active material particles and a plurality of the noble metal particles; applying and then heating a liquid material which contains a forming material of an inorganic solid electrolyte to obtain a complex in which a solid electrolyte layer is formed on the surface of the active material molded body including the inside of the communication holes of the active material molded body; and bonding a current collector to one surface of the complex so as to be in contact with the active material molded body.

When the electrode complex produced through these processes is applied to the lithium battery, the obtained lithium battery stably maintains a high output and high capacity for a long period of time.

In the method of producing an electrode complex according to the aspect of the invention, it is preferable that, in the heating of the active material particles, the active material molded body is obtained by molding a mixture of the plurality of active material particles and the plurality of noble metal particles through compression and then heating the mixture.

With this configuration, it is possible to obtain an active material molded body formed of a porous body.

In the method of producing an electrode complex according to the aspect of the invention, it is preferable that, in the heating of the active material particles, the active material molded body is obtained by heating a slurry formed by dispersing the mixture of the plurality of active material particles and the plurality of noble metal particles in a solvent.

With this configuration, it is possible to obtain an active material molded body formed of a porous body.

In the method of producing an electrode complex according to the aspect of the invention, it is preferable that, in the heating of the active material particles, the active material particles and the noble metal particles are heated in a temperature range of 850° C. to lower than 1000° C.

With this configuration, it is possible to reliably obtain an active material molded body in which active material particles are sintered and integrated with each other. Further, it is possible to reliably prevent a noble metal having a melting point of 1000° C. or higher from being fused at the time of sintering the active material particles.

A lithium battery according to still another aspect of the invention includes the electrode complex according to the aspect of the invention; and an electrode which is provided on the other surface of the complex by being bonded to the solid electrolyte layer.

When a lithium battery includes an electrode complex having an active material molded body with the above-described configuration, the lithium battery stably maintains a high output and high capacity for a long period of time.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an electrode complex, a method of producing an electrode complex, and a lithium battery according to the invention will be described in detail with reference to the accompanying drawings.

Further, hereinafter, a lithium secondary battery to which the lithium battery according to the invention is applied will be firstly described.

Lithium Secondary Battery

First Embodiment

Figure 1:
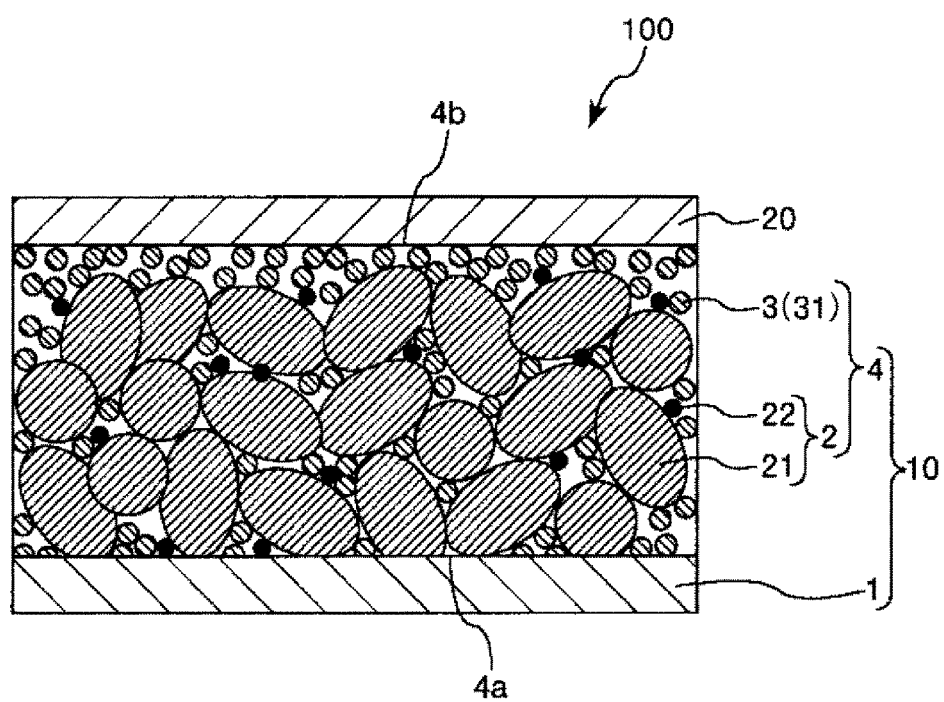
FIG. 1 is a longitudinal sectional view illustrating a first embodiment in which a lithium battery according to the invention is applied to a lithium secondary battery.

FIG. 1 is a longitudinal sectional view illustrating a first embodiment in which a lithium battery according to the invention is applied to a lithium secondary battery. In addition, hereinafter, for convenience of description, the upper portion of FIG. 1 is referred to as the "upside" and the lower portion of FIG. 1 is referred to as the "downside." In addition, for the purpose of easily understanding the drawings, the dimensions or the ratios of respective constituent elements are appropriately changed from the actual dimensions or ratios thereof.

A lithium secondary battery 100 includes an electrode complex 10 and an electrode 20 bonded to the electrode complex 10. The lithium secondary battery 100 is a so-called all-solid lithium (ion) secondary battery.

The electrode complex (electrode complex according to the invention) 10 includes a current collector 1, an active material molded body 2, and a solid electrolyte layer 3 as illustrated in FIG. 1. In addition, hereinafter, a configuration of combining the active material molded body 2 and the solid electrolyte layer 3 is also referred to as a complex 4. The complex 4 is positioned between the current collector 1 and the electrode 20 and bonded to a pair of respective surfaces 4a and 4b facing each other.

The current collector 1 is an electrode for extracting a current generated by a cell reaction and provided in a state of being in contact with the solid electrolyte layer 3 on one surface 4a of the complex 4 and the active material molded body 2 exposed from the solid electrolyte layer 3.

The current collector 1 functions as a positive electrode in a case where the active material molded body 2 described below is configured of a positive-electrode active material and functions as a negative electrode in a case where the active material molded body 2 is configured of a negative-electrode active material.

Further, examples of forming materials (constituent materials) of the current collector 1 include one kind of metal selected from a group consisting of copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and palladium (Pd); and an alloy containing two or more kinds of metal elements selected from the group.

The shape of the current collector 1, which is not particularly limited, may be a plate, foil, or a network. Further, the surface of the current collector 1 may be flat or uneven.

The active material molded body 2 is a porous molded body which includes particulate active material particles 21 containing a lithium double oxide and particulate noble metal particles 22 containing a noble metal with a melting point of 1000° C. or higher and is formed by being three-dimensionally connected to a plurality of the active material particles 21 and a plurality of the noble metal particles 22.

A plurality of micropores included in the active material molded body 2 which is a porous molded body form communication holes communicating with each other in a network shape in the inside of the active material molded body 2. That is, the active material molded body 2 is configured of a porous body having gaps formed of communication holes.

The active material particles 21 are particulate and configured as a main material of the active material molded body 2. Further, a plurality of the active material particles 21 form a porous body by being connected to each other.

The active material particles 21 contain an electrode active material of an inorganic substance having a lithium double oxide as a forming material (constituent material) and the current collector 1 may become a positive electrode or a negative electrode by appropriately selecting the kind of the forming material.

In a case where the current collector 1 is used as a positive electrode, for example, a known lithium double oxide can be used as the positive electrode active material for the forming material of the active material molded body 2.

In addition, the "lithium double oxide" of the present specification is an oxide which necessarily contains lithium and contains two or metal ions as a whole and in which the presence of an oxo acid ion is not recognized.

Examples of the lithium double oxide include $LiCoO_2$, $LiNiO_2$, $LiMn_2O_4$, $Li_2Mn_2O_3$, $LiFePO_4$, $Li_2FeP_2O_7$, $LiMnPO_4$, $LiFeBO_3$, $Li_3V_2(PO_4)_3$, $Li_2CuO_2$, $LiFeF_3$, $Li_2FeSiO_4$, and $Li_2MnSiO_4$. Further, in the present specification, a solid solution in which some atoms in crystals of these lithium double oxides are substituted with another transition metal, typical metal, alkali metal, alkaline rare-earth metal, lanthanide, chalcogenide, or halogen is included in a lithium double oxide and the solid solution can be used as a positive electrode active material.

Moreover, in a case where the current collector 1 is used as a negative electrode, a lithium double oxide such as $Li_4Ti_5O_{12}$ or $Li_2Ti_3O_7$ can be used as the negative electrode active material for the forming material of the active material molded body 2.

When the active material particles 21 contains the above-described lithium double oxide, the active material particles 21 perform delivery of electrons among a plurality of active material particles 21, performs delivery of lithium ions between the active material particles 21 and the solid electrolyte layer 3, and functions as the active material molded body 2.

The average particle size of the active material particles 21 is preferably in the range of 300 nm to 5 μm, more preferably in the range of 450 nm to 3 μm, and still more preferably in the range of 500 nm to 1 μm. When an active material having such an average particle diameter is used, the porosity of the active material molded body 2 to be obtained can be set to be in the range described below. In this manner, the surface area in a micropore of the active material molded body 2 tends to be expanded, the contact area between the active material molded body 2 and the solid electrolyte layer 3 tends to be expanded, and thus the lithium battery using the electrode complex 10 tends to have high capacity.

When the average particle diameter of the active material particles 21 is less than the above-described lower limit, depending on the kind of liquid described below, the radius of the micropore of the active material molded body to be formed tends to be several tens of nanometers, which is extremely small and the liquid containing a precursor of an inorganic solid electrolyte is unlikely to infiltrate into the inside of the micropore according to a method of producing a lithium secondary battery described below. As a result, there is a concern that the solid electrolyte layer 3 in contact with the surface in the inside of the micropore is unlikely to be formed.

Further, when the average particle diameter of the active material particles 21 exceeds the above-described upper limit, the specific surface area which is a surface area per unit mass of the active material molded body 2 to be formed becomes smaller and the contact area between the active material molded body 2 and the solid electrolyte layer 3 becomes smaller. Consequently, there is a concern that an output cannot be sufficiently obtained in the lithium secondary battery 100. Further, since the ion diffusion distance from the inside of the active material particles 21 to the solid electrolyte layer 3 becomes longer, there is a concern that the lithium double oxide in the vicinity of the center of the active material particles 21 is unlikely to contribute to the function of the battery.

Further, the average particle diameter of the active material particles 21 can be measured by dispersing the active material particles 21 in n-octanol such that the concentration thereof is in the range of 0.1% by weight to 10% by weight and acquiring the median size using a light scattering particle size distribution measuring device (Nanotrac UPA-EX250, manufactured by NIKKISO CO., LTD.).

The noble metal particles 22 are particulate, contained as a secondary material of the active material molded body 2, adhered to the surface of a plurality of active material particles 21 being connected to each other, interposed between the active material particles 21, and contained in a porous body.

The noble metal particles 22 contain a noble metal having a melting point of 1000° C. or higher as a forming material (constituent material). In this manner, when the noble metal particles 22 are contained, it is possible to smoothly perform delivery of electrons among a plurality of the active material particles 21 and delivery of lithium ions between the active material particles 21 and the solid electrolyte layer 3. Moreover, the delivery of electrons among the plurality of active material particles 21 and the delivery of lithium ions between the active material particles 21 and the solid electrolyte layer 3 are stably maintained for a long period of time.

Further, since lithium ions are released from the surface of the active material particles 21 at the time of charging and are stored on the surface of the active material particles 21 at the time of discharging, the volume of the active material particles 21 fluctuates. For this reason, there is a possibility that paths of electron conduction are changed when charging or discharging. However, since the particle diameter of the active material particles 21 is greater than that of the noble metal particles 22 and the noble metal particles 22 are dispersed in and adhered to the surface of the active material molded body 2, different paths of electron conduction corresponding to the fluctuation in volume can be secured.

Accordingly, when the electrode complex 10 including the active material molded body 2 with the above-described configuration is applied to the lithium secondary battery 100, the lithium secondary battery 100 stably maintains a high output and high capacity for a long period of time.

Examples of the noble metal having a melting point of 1000° C. or higher, which is not particularly limited, gold (Au, melting point: 1061° C.), platinum (Pt, melting point: 1768° C.), palladium (Pd, melting point: 1554° C.), rhodium (Rh, melting point: 1964° C.), indium (Ir, melting point: 2466° C.), ruthenium (Ru, melting point: 2334° C.), and osmium (Os, melting point: 3033° C.). These metals may be used alone or an alloy of these metals may be used. Among these, it is preferable that the noble metal is at least one of platinum and palladium. These noble metals are relatively inexpensive and easily handled and have excellent conductivity of lithium ions and electrons. For this reason, when the noble metals are used as a constituent material of the noble metal particles 22, it is possible to more smoothly perform delivery of electrons among the plurality of active material particles 21 and delivery of lithium ions between the active material particles 21 and the solid electrolyte layer 3 and to stably maintain the state for a long period of time.

Further, the average particle diameter of the noble metal particles 22 is preferably in the range of 0.1 μm to 10 and more preferably in the range of 0.1 μm to 5 μm. Moreover, the average particle diameter of the noble metal particles 22 can be measured by the same method used when the average particle diameter of the active material particles 21 is measured.

Further, the content ratio of the noble metal particles 22 in the active material molded body 2 is preferably in the range of 0.1% by weight to 10% by weight and more preferably in the range of 1% by weight to 10% by weight.

When the average particle diameter and the content ratio of the noble metal particles 22 are respectively set to be in the above-described ranges, it is possible for the noble metal particles 22 to be more reliably adhered to the surface of the active material particles 21 and to be interposed between the active material particles 21. As a result, it is possible to more smoothly perform delivery of electrons among a plurality of the active material particles 21 and delivery of lithium ions between the active material particles 21 and the solid electrolyte layer 3 and to stably maintain the state for a long period of time.

The porosity of the above-described active material molded body 2 having the active material particles 21 and the noble metal particles 22 is preferably in the range of 10% to 50% and more preferably in the range of 30% to 50%. When the active material molded body 2 has the above-described porosity, the surface area in a micropore of the active material molded body 2 tends to be expanded, the contact area between the active material molded body 2 and the solid electrolyte layer 3 tends to be expanded, and thus the lithium battery using the electrode complex 10 tends to have high capacity.

For example, the porosity thereof can be measured based on Equation (I) below from (1) the volume (apparent volume) of the active material molded body 2 having micropores which is obtained from the external dimensions of the active material molded body 2, (2) the mass of the active material molded body 2, and (3) the density of the active material constituting the active material molded body 2.

Porosity (%)=(1−(Mass of active material molded body)/(Apparent volume)×(Density of active material))

Moreover, although will be described below in detail, the porosity of the active material molded body 2 can be controlled using a pore-forming material configured of particulate organic substances during a process of forming the active material molded body 2.

The solid electrolyte layer (first solid electrolyte layer) 3 uses a solid electrolyte as a forming material (constituent material) and is provided by being brought into contact with the surface of the active material molded body 2 including the inside of micropores (gaps) of the active material molded body 2.

Examples of the solid electrolyte include oxides, sulfides, halides, and nitrides such as $SiO_2$—$P_2O_5$—$Li_2O$, $SiO_2$—$P_2O_5$—$LiCl$, $Li_2O$—$LiCl$—$B_2O_3$, $Li_{3.4}V_{0.6}Si_{0.4}O_4$, $Li_{14}ZnGe_4O_{16}$, $Li_{3.6}V_{0.4}Ge_{0.6}O_4$, $Li_{1.3}Ti_{1.7}Al_{0.3}(PO_4)_3$, $Li_{2.88}PO_{3.73}N_{0.14}$, $LiNbO_3$, $Li_{0.35}La_{0.55}TiO_3$, $Li_7La_3Zr_2O_{12}$, $Li_2S$—$SiS_2$, $Li_2S$—$SiS_2$—$LiI$, $Li_2S$—$SiS_2$—$P_2S_5$, $LiPON$, $Li_3N$, $LiI$, $LiI$—$CaI_2$, $LiI$—$CaO$, $LiAlCl_4$, $LiAlF_4$, $LiI$—$Al_2O_3$, $LiF$—$Al_2O_3$, $LiBr$—$Al_2O_3$, $Li_2O$—$TiO_2$, $La_2O_3$—$Li_2O$—$TiO_2$, $Li_3NI_2$, $Li_3N$—$LiI$—$LiOH$, $Li_3N$—$LiCl$, $Li_6NBr_3$, $LiSO_4$, $Li_4SiO_4$, $Li_3PO_4$—$Li_4SiO_4$, $Li_4GeO_4$—$Li_3VO_4$, $Li_4SiO_4$—$Li_3VO_4$, $Li_4GeO_4$—$Zn_2GeO_2$, $Li_4SiO_4$—$LiMoO_4$, and $LiSiO_4$—$Li_4ZrO_4$. Moreover, the solid electrolyte may be crystalline or amorphous. Further, in the present specification, a solid solution in which some atoms of these compositions are substituted with another transition metal, typical metal, alkali metal, alkaline rare-earth metal, lanthanide, chalcogenide, or halogen can be used as a solid electrolyte.

The solid electrolyte which is a constituent material of the solid electrolyte layer 3 is generated by baking (heating) the precursor of the solid electrolyte as described in a method of producing a lithium secondary battery described below. During the baking, the generated solid electrolyte constitutes a granule 31 formed of secondary particles obtained by granulating the primary particles. Accordingly, the solid electrolyte layer 3 is provided by being brought into contact with the surface of the active material molded body 2 including the inside of gaps of the active material molded body 2, but the solid electrolyte layer 3 is configured of a porous body in the same manner as that of the active material molded body 2 because the solid electrolyte layer is configured of an aggregate of the granule 31. Consequently, the solid electrolyte layer 3 is formed so as to fill the inside of the gaps of the active material molded body 2, but some gaps remain even after the filling. That is, in the present embodiment, the complex 4 including the active material molded body 2 and the solid electrolyte layer 3 includes gaps.

The ionic conductivity of the solid electrolyte layer 3 is preferably $1\times10^{-5}$ S/cm. When the solid electrolyte layer 3 has the above-described ionic conductivity, it is possible for ions included in the solid electrolyte layer 3 in a position separated from the surface of the active material molded body 2 to reach the surface of the active material molded body 2 and to contribute to a cell reaction in the active material molded body 2. Therefore, the utilization rate of the active material in the active material molded body 2 is increased and thus the capacity can be increased. At this time, when the ionic conductivity is less than the above-described lower limit, depending on the kind of solid electrolyte layer 3, only the active material in the vicinity of the surface layer of the surface facing the counter electrode in the active material molded body 2 contributes to the cell reaction and the capacity may be decreased.

Further, the "ionic conductivity of the solid electrolyte layer 3" indicates the "total ionic conductivity" which is the sum of the "bulk conductivity" which is the conductivity of the above-described inorganic electrolyte constituting the solid electrolyte layer 3 and the "grain boundary ionic conductivity" which is the conductivity between crystal particles in a case where the inorganic electrolyte is a crystalline material.

Moreover, the ionic conductivity of the solid electrolyte layer 3 can be measured by sintering solid electrolyte powder after being press-molded at 624 MPa to have a shape of a tablet at a temperature of 700° C. for 8 hours under an air atmosphere and forming a platinum electrode having a dimension of a diameter of 0.5 cm and a thickness of 100 nm on both surfaces of the press-molded body by sputtering and performing an alternating current impedance method. As the measuring device, for example, an impedance analyzer (type: SI1260, manufactured by Solatron Analytical) is used.

In addition, although will be described in detail below, preferably, one surface 4a of the complex 4 is a polished surface to which a polishing process is applied at the time of being produced and the active material molded body 2 is exposed thereto from the solid electrolyte layer 3. For this reason, in a case where such a polishing process is carried out, scratch marks (polished marks) which are traces of the polishing process remain on the one surface 4a.

In addition, the electrode complex 10 of the present embodiment is configured of only inorganic materials since the active material molded body 2 is molded without using an organic material, a binder joining active materials, and a conductive assistant for securing the conductivity of the active material molded body 2 at the time of molding the active material molded body 2. Specifically, the mass decrease rate of the electrode complex 10 of the present embodiment at the time when the complex 4 (the active material molded body 2 and the solid electrolyte layer 3) is heated at 400° C. for 30 minutes becomes 5% by mass or less. The mass decrease rate thereof is preferably 3% by mass or less, more preferably 1% by mass or less, and particularly preferably in the error range in which a decrease in mass is not measured. That is, the mass decrease rate at the time when the complex 4 is heated at 400° C. for 30 minutes may be 0% by mass or greater. Since the complex 4 has the above-described mass decrease rate, the complex 4 only contains a substance such as a solvent or absorbed water that evaporates under predetermined heating conditions or an organic material which is gasified by being burned or oxidized under the predetermined heating conditions by an amount of 5% by mass or less with respect to the whole configuration.

Moreover, the mass decrease rate of the complex 4 can be calculated from the ratio of the mass of the complex 4 before being heated to the mass thereof after being heated by heating the complex 4 under predetermined heating conditions to measure the complex 4 after being heated under the predetermined heating conditions using a differential thermal-thermogravimetric simultaneous measuring device (TG-DTA).

In the electrode complex 10 of the present embodiment, the active material molded body 2 includes communication holes in which a plurality of micropores communicate each other in a network shape in the inside thereof and a solid portion of the active material molded body 2 also forms a network structure. For example, it is known that $LiCoO_2$ which is a positive electrode active material is anisotropic in electron conductivity of crystals. For this reason, when an active material molded body is formed using $LiCoO_2$ as a forming material, it is considered that electrons are unlikely to be conducted in the inside depending on the direction showing the electron conductivity of crystals in the configuration in which micropores are formed through machining or micropores are extended in a specific direction. However, when micropores communicate each other in a network shape as in the active material molded body 2 and the solid portion of the active material molded body 2 has a network structure, an electrochemically lubricative continuous surface can be formed regardless of anisotropy of the electron conductivity or ionic conductivity of crystals. Consequently, excellent electron conductivity can be secured regardless of the kind of active material to be used.

In addition, in the electrode complex 10 of the present embodiment, since the complex 4 has the above-described configuration, the amount of the binder or conductive assistant to be added to the complex 4 is suppressed and the capacity density per unit volume of the electrode complex 10 is increased compared to the case where a binder or a conductive assistant is used.

Further, in the electrode complex 10 (complex 4) of the present embodiment, the solid electrolyte layer 3 is also in contact with the surface in the micropores of the porous active material molded body 2. For this reason, the contact area between the active material molded body 2 and the solid electrolyte layer 3 becomes larger and thus the interface impedance can be reduced compared to a case where the active material molded body 2 is not a porous body or the solid electrolyte layer 3 is not formed in the micropores. Therefore, excellent charge transfer on the interface between the active material molded body 2 and the solid electrolyte layer 3 becomes possible.

Further, in the electrode complex 10 of the present embodiment, while the current collector 1 is in contact with the active material molded body 2 exposed to one surface of the complex 4, the solid electrolyte layer 3 infiltrates into the micropores of the porous active molded body 2, includes the inside of the micropores, and is in contact with the surface of the active material molded body 2 other than the surface in contact with the current collector 1. In the electrode complex 10 having such a configuration, it is obvious that the contact area between the active material molded body 2 and the solid electrolyte layer 3 (second contact area) is larger than the contact area (first contact area) between the current collector 1 and the active material molded body 2.

Here, if the electrode complex has a configuration in which the first contact area is the same as the second contact area, since the charge is more easily transferred in the interface between the current collector 1 and the active material molded body 2 than the interface between the active material molded body 2 and the solid electrolyte layer 3, the interface between the active material molded body 2 and the solid electrolyte layer 3 becomes a bottleneck of the charge transfer. Accordingly, in the whole electrode complex, excellent charge transfer is inhibited. However, when the second contact area is larger than the first contact area in the electrode complex 10 of the present embodiment, the above-described bottleneck can be easily resolved and excellent charge transfer in the whole electrode complex becomes possible.

From the reason described above, the electrode complex 10 which is produced according to the production method of the present embodiment described below and has the above-described configuration can improve the capacity of the lithium battery using the electrode complex 10 and maintain a high output.

Further, in the complex 4 including the active material molded body 2 and the solid electrolyte layer 3, both of the active material molded body 2 and the solid electrolyte layer 3 are exposed on one surface 4a of the complex 4 and the solid electrolyte layer 3 is singly exposed on another surface 4b. In this state, the current collector 1 is bonded to the one surface 4a and the electrode 20 is bonded to another surface 4b. When the complex 4 has such a configuration, in the lithium secondary battery 100, it is possible to prevent connection of the electrode 20 with the current collector 1 through the active material molded body 2, that is, a short circuit. In other words, a solid electrolyte 3 functions as a short-circuit preventing layer that prevents generation of a short circuit in the lithium secondary battery 100.

The electrode 20 is provided on another surface 4b of the complex 4 on the opposite side of the current controller 1, being in contact with the solid electrolyte layer 3, without being in contact with the active material molded body 2.

The electrode 20 functions as a negative electrode in a case where the active material molded body 2 is configured of a positive electrode active material and functions as a positive electrode in a case where the active material molded body 2 is configured of a negative electrode active material.

As the forming material (constituent material) of the electrode 20, lithium (Li) is exemplified when the electrode 20 is a negative electrode and aluminum (Al) is exemplified when the electrode 20 is a positive electrode.

The thickness of the electrode 20, which is not particularly limited, is preferably in the range of 1 µm to 100 µm and more preferably in the range of 20 µm to 50 µm.

Method of Producing Lithium Secondary Battery

Hereinafter, a method of producing the lithium secondary battery 100 of the first embodiment illustrated in FIG. 1 will be described.

FIGS. 2A to 5 are views for describing the method of producing the lithium secondary battery illustrated in FIG. 1. In addition, hereinafter, for convenience of description, the upper portions of FIGS. 2A to 5 are referred to as the "upside" and the lower portions of FIGS. 2A to 5 are referred to as the "downside." In addition, in FIGS. 2A to 5, for the purpose of easily understanding the drawings, the dimensions or the ratios of respective constituent elements are appropriately changed from the actual dimensions or ratios thereof.

[1] First, an active material molded body 2 formed of a porous body is obtained by heating a plurality of particulate active material particles 21 and a plurality of particulate noble metal particles 22 to be three-dimensionally connected with each other (first process).

Figure 2A:
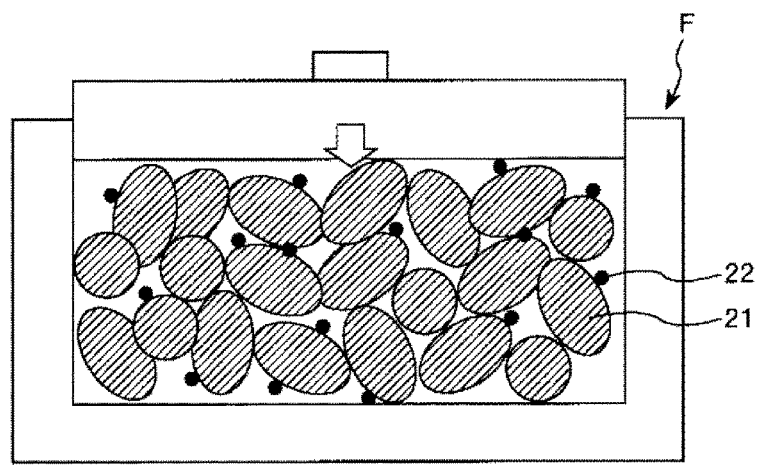
FIGS. 2A and 2B are views for describing a method of producing the lithium secondary battery illustrated in FIG. 1.
Figure 2B:
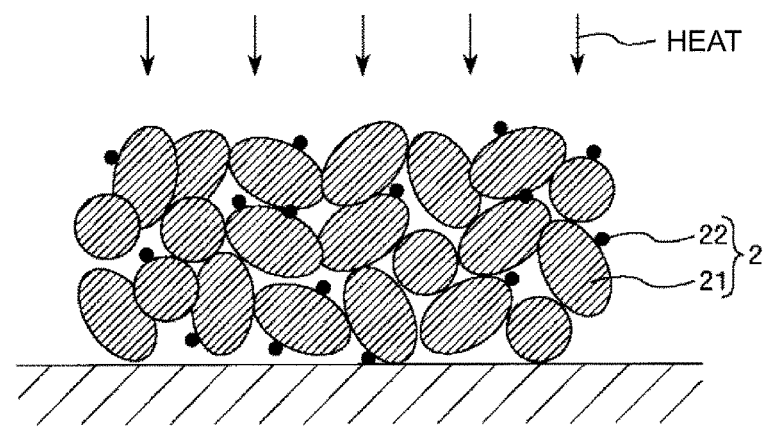

As illustrated in FIGS. 2A and 2B, for example, the active material molded body 2 can be obtained by compressing and molding a mixture of the plurality of active material particles 21 and the plurality of noble metal particles 22 using a molding die F (see FIG. 2A) and then performing a heat treatment (heating) on the obtained compressed and molded material (see FIG. 2B).

It is preferable that the heat treatment (heating) is performed in a temperature range of 850° C. to lower than 1000° C. In this manner, it is possible to reliably obtain the active material molded body 2 in which the active material particles 21 are sintered and integrated. Further, when the active material particles 21 are sintered, it is possible to reliably prevent a noble metal having a melting point of 1000° C. or higher from being fused. Accordingly, it is possible to reliably prevent generation of a different compound through a reaction of a lithium double oxide and a noble metal having a melting point of 1000° C. or higher which are contained in the active material particles 21. That is, it is possible to reliably prevent deterioration and degradation of the active material particles 21 caused by the noble metal particles 22 being contained.

Consequently, by performing the heat treatment in the above-described temperature range, the resistivity of the active material molded body 2 can be adjusted to be preferably 700Ω or less even when a conductive assistant which is different from the noble metal particles 22 is not added thereto. In this manner, the output of the lithium secondary battery 100 to be obtained becomes sufficient.

At this time, when the treatment temperature is lower than 850° C., since sintering is not sufficiently promoted and the electron conductivity in crystals of the active material is deteriorated depending on the kind of lithium double oxide being used, a desired output may not be obtained for the lithium secondary battery 100 to be obtained.

Further, when the treatment temperature is higher than 1000° C., since lithium ions are excessively volatilized from crystals of the lithium double oxide and the electron conductivity of the lithium double oxide is deteriorated, there is a concern that the capacity of the electrode complex 10 to be obtained is decreased. In addition, depending on the kind of the noble metal particles 22, there is a concern that the noble metal particles 22 are fused, a reactant is generated between the lithium double oxide and the noble metal particles 22, and the characteristics of the active material particles 21 are changed.

Accordingly, in order to obtain an appropriate output and capacity, the above-described treatment temperature is preferably in the range of 850° C. to lower than 1000° C., more preferably in the range of 875° C. to lower than 1000° C., and still more preferably in the range of 900° C. to 920° C.

The heat treatment of the present process is preferably in the range of 5 minutes to 36 hours and more preferably in the range of 4 hours to 14 hours.

By carrying out the above-described heat treatment, the growth of grain boundaries in the active material particles 21 and sintering among the active material particles 21 are promoted without allowing the noble metal particles 22 to be fused, the shape of the active material molded body 2 to be obtained can be easily held and thus the amount of a binder of the active material molded body 2 to be added can be reduced. In addition, since bonds among the active material particles 21 are formed due to the sintering and a transfer path of electrons among the active material particles 21 is formed, the amount of a conductive assistant to be added can be reduced.

Moreover, $LiCoO_2$ can be preferably used as the forming material of the active material particles 21. In this manner, the effects can be more markedly exhibited. That is, it is possible to reliably obtain the active material molded body 2 formed from the active material particle 21 being sintered and integrated and to reliably prevent deterioration and degradation of the active material particles 21 caused by the noble metal particles 22 being contained.

In addition, the active material molded body 2 to be obtained has a configuration in which a plurality of micropores included in the active material molded body 2 are formed of communication holes communicating each other in a shape of a network in the inside of the active material molded body 2.

Moreover, an organic polymer compound such as polyvinylidene fluoride (PVdF) or polyvinyl alcohol (PVA) may be added to the forming material used to form the active material particles 21 as a binder. These binders are burned or oxidized during the heat treatment of the present process and thus the amount thereof is reduced.

In addition, it is preferable that a particulate pore-forming material using a polymer or carbon powder as a forming material is added to the forming material to be used as a mold of micropores at the time of compacting. The porosity of the active material molded body can be easily controlled by mixing these pore-forming materials. Such pore-forming materials are decomposed and removed by burning or oxidizing during the heat treatment and thus the amount thereof in the active material molded body to be obtained is reduced.

The average particle diameter of the pore-forming material is preferably in the range of 0.5 μm to 10 μm.

Further, it is preferable that the pore-forming material contains particles (first particles) using a material with deliquescency as a forming material. Since water generated around the first particles due to deliquescence of the first particles functions as a binder of joining particulate lithium double oxides, the shape of the pore-forming material can be maintained from when particulate lithium double oxides are compression-molded to when the heat treatment is carried out. Therefore, it is possible to easily obtain an active material molded body without adding another binder or while the amount of a binder to be added is reduced and to easily obtain an electrode complex with high capacity.

As the first particles, particles using polyacrylic acid as a forming material are exemplified.

Further, it is preferable that the pore-forming material further contains particles (second particles) using a material without deliquescency as a forming material. The pore-forming material containing the second particles becomes more easily handled. Moreover, when the pore-forming material has deliquescency, the porosity of the active material molded body is deviated from a desired set value according to the content of moisture around the pore-forming material, but the deviation of the porosity can be suppressed by containing the second particles without deliquescency as a pore-forming material at the same time.

Further, as described above, the active material molded body 2 may be obtained using a method of heating a slurry obtained by dispersing a mixture of the active material particles 21 and the noble metal particles 22 in a solvent as well as the method of compressing and molding a mixture of the active material particles 21 and the noble metal particles 22 and heating the mixture.

That is, the method of using a slurry includes a preparation process of preparing a slurry containing the active material particles 21 and the noble metal particles 22 and a drying process of heating the slurry to obtain the active material molded body 2. Hereinafter, these processes will be described below.

[1-1] First, a binder is dissolved in a solvent and a slurry 26 obtained by dispersing the active material particles 21 and the noble metal particles 22 is prepared. In addition, a dispersant such as oleylamine may be contained in the slurry 26.

Figure 5:
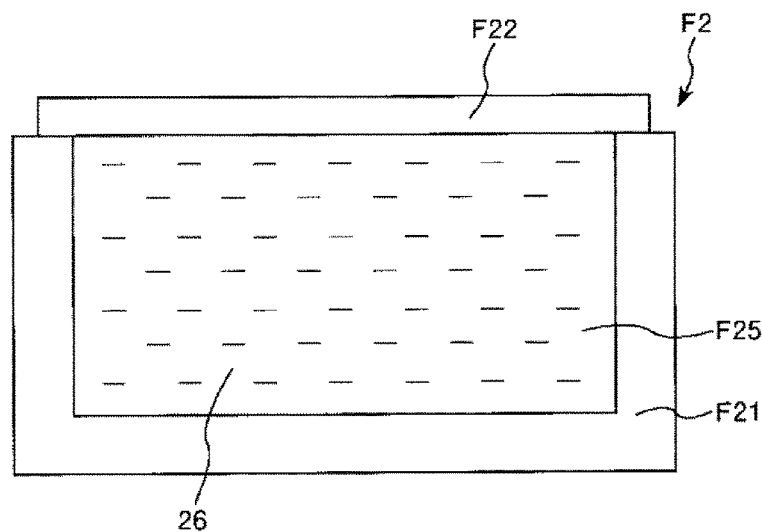
FIG. 5 is a view for describing the method of producing the lithium secondary battery illustrated in FIG. 1.

Next, a bottom portion F21 including a concave portion F25 and a molding die F2 including a lid portion F22 are prepared, the slurry 26 is added dropwise to the concave portion R25 of the bottom portion F21, and the bottom portion F21 is covered by the lid portion F22 (see FIG. 5).

In addition, the total content of the active material particles 21 and the noble metal particles 22 in the slurry 26 is preferably in the range of 10% by weight to 60% by weight and more preferably in the range of 30% by weight to 50% by weight. In this manner, in a next process [1-2], the active material molded body 2 with a high filling rate can be obtained.

In addition, examples of the binder, which are not particularly limited, include a cellulose-based binder, an acrylic binder, a polyvinyl alcohol-based binder, and a polyvinyl butyral-based binder in addition to polycarbonate. Among these, the binder can be used alone or in combination or two or more kinds thereof.

In addition, as the solvent, which is not particularly limited, an aprotic solvent is preferably used. In this manner, deterioration of the active material particles 21 due to contact with the solvent can be suppressed.

Specific examples of the aprotic solvent include butanol, ethanol, propanol, methyl isobutyl ketone, toluene, and xylene, and these solvents can be used alone or in combination of two or more kinds thereof.

[1-2] Next, the slurry 26 is dried by heating the slurry 26 containing the active material particles 21 and the active material molded body 2 is obtained by sintering the active material particles 21 contained in the slurry 26.

Further, as the method of heating the slurry 26 containing the active material particles 21, which is not particularly limited, a method of spraying and drying the slurry 26 with a spray drier or the like is exemplified.

Further, the heating conditions when the slurry 26 is heated are set in the same manner as the conditions when the above-described compression-molded material is heat-treated.

In addition, it is preferable that the slurry 26 is heated in multiple stages in which the heating temperature is increased step by step. Specifically, it is preferable that the slurry 26 is dried at room temperature; the heating temperature is increased from room temperature to 300° C. for 2 hours, from 300° C. to 350° C. for 0.5 hours, and from 350° C. to 1000° C. for 2 hours; and the concave portion F25 is covered by the lid portion F22 and is baked at 1000° C. for 8 hours. When the heating temperature is increased under the above-described conditions, the binder contained in a solvent is reliably burned off.

The active material molded body 2 can be also obtained by performing the above-described processes. Further, since the noble metal particles 22 can be uniformly dispersed in the slurry when the method using a slurry is applied, the noble metal particles 22 are more uniformly dispersed in the whole active material molded body 2 to be obtained.

Figure 3A:
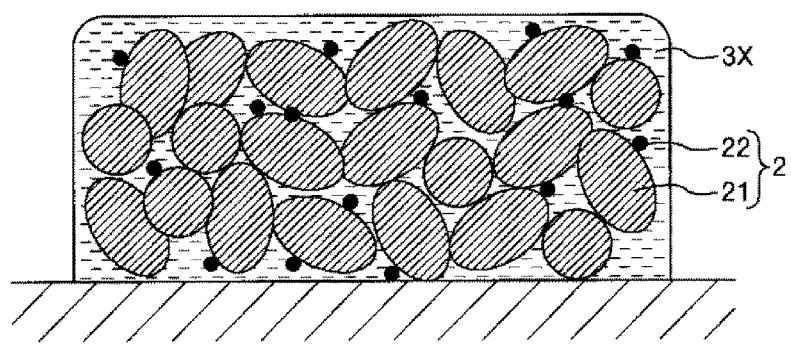
FIGS. 3A and 3B are views for describing the method of producing the lithium secondary battery illustrated in FIG. 1.
Figure 3B:
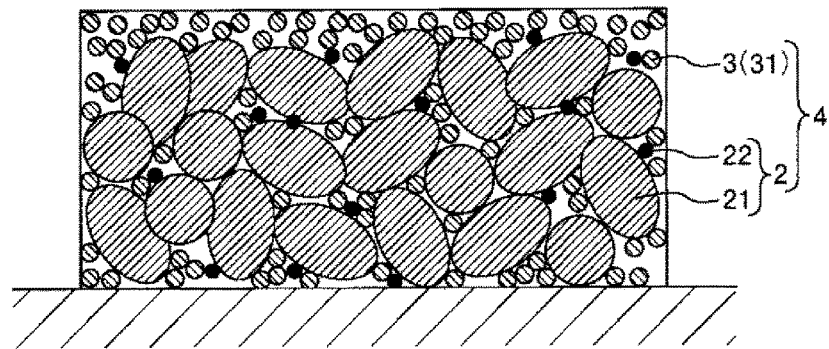

[2] Next, as illustrated in FIGS. 3A and 3B, the surface of the active material molded body 2 having the inside of the communication holes of the active material molded body 2 is coated with a liquid 3X including a solid electrolyte precursor (FIG. 3A), and the solid electrolyte layer 3 using the precursor as an inorganic solid electrolyte is formed (FIG. 3B, second process) by baking (heating) the liquid 3X.

In this manner, a complex 4 including the active material molded body 2 and the solid electrolyte layer 3 is formed.

The liquid 3X may contain a solvent in which the precursor is soluble, in addition to the precursor. When the liquid 3X contains a solvent, the solvent may be appropriately removed after the coating of the liquid 3X and before the baking of the liquid 3X. For removal of the solvent, a method selected from known methods of heating, reducing pressure, sending air, and the like or a combination of two or more methods thereof can be applied.

Here, since the solid electrolyte layer 3 is formed by applying the liquid 3X with fluidity, it is possible to excellently form a solid electrolyte on the surface in the inside of fine micropores of the active material molded body 2. Consequently, the contact area between the active material molded body 2 and the solid electrolyte layer 3 can be easily expanded and the current density of the interface between the active material molded body 2 and the solid electrolyte layer 3 is decreased. As a result, a large output can be easily obtained.

Various methods can be used for application of the liquid 3X as long as the liquid 3X can infiltrate into the inside of the micropores of the active material molded body 2. For example, application of the liquid 3X may be performed by adding the liquid 3X dropwise to a space where the active material molded body 2 is placed, immersing the active material molded body 2 in a space where the liquid 3X is stored, or bringing the end portion of the active material molded body 2 into contact with a space where the liquid 3X is stored and then impregnating the micropores with the liquid 3X using a capillary phenomenon. In FIG. 3A, as described above, a method of adding the liquid 3X dropwise using a dispenser D is shown.

Further, in the present process, a solid electrolyte is generated by baking (heating) a precursor of the solid electrolyte and the solid electrolyte generated at the time of baking the precursor forms the granule 31 formed of secondary particles obtained by granulating the primary particles. Accordingly, the solid electrolyte layer 3 is formed in the inside of the fine micropores (gaps) of the active material molded body 2, but is provided as an aggregate of the granules 31. For this reason, the solid electrolyte layer 3 is formed as a porous body in the same manner as that of the active material molded body 2. Accordingly, the solid electrolyte layer 3 is formed so as to fill the inside of the gaps of the active material molded body 2, but some gaps remain even after the filling. That is, in the present embodiment, the complex 4 including the active material molded body 2 and the solid electrolyte layer 3 is formed as a complex having gaps.

In addition, as the precursor of the solid electrolyte, (A), (B), or (C) below is exemplified.

(A) A composition which contains metal atoms included in an inorganic solid electrolyte at a ratio according to the composition formula of the inorganic solid electrolyte and includes salts turned into an inorganic solid electrolyte through oxidation.

(B) A composition which includes metal alkoxide containing metal atoms included in an inorganic solid electrolyte at a ratio according to the composition formula of the inorganic solid electrolyte.

(C) A dispersion liquid obtained by dispersing a fine particle sol containing metal atoms included in inorganic solid electrolyte fine particles or an inorganic solid electrolyte at a ratio according to the composition formula of the inorganic solid electrolyte in a solvent, (A) or (B).

Further, the salts included in (A) contain a metal complex. Further, (B) is a precursor when an inorganic solid electrolyte is formed using a so-called sol-gel method.

The precursor is baked in an air atmosphere at a temperature lower than the temperature of the heat treatment performed to obtain the above-described active material molded body 2. Specifically, the baking temperature is preferably in the range of 300° C. to 700° C. In this manner, an inorganic solid electrolyte is generated from a precursor through baking and then the solid electrolyte 3 is formed. In addition, as the forming material of the solid electrolyte layer, $Li_{0.35}La_{0.55}TiO_3$ can be preferably used.

When the baking is performed in the above-described temperature range, a solid-phase reaction occurs due to interdiffusion of elements constituting the active material particles 21 of the active material molded body 2 and the solid electrolyte layer 3 on the interface therebetween and generation of electrochemically inert by-products can be suppressed. In addition, the crystallinity of the inorganic solid electrolyte is improved so that the ionic conductivity of the solid electrolyte layer 3 can be improved. In addition, a sintering portion is generated on the interface between the active material particles 21 and the solid electrolyte layer 3 and the charge becomes easily transferred on the interface. In this manner, the capacity and the output of the lithium secondary battery 100 are improved. Further, it is possible to reliably prevent generation of by-products between the active material particles 21 or the solid electrolyte layer 3 and the noble metal particles 22 caused by the noble metal particles 22, which contain a noble metal with a melting point of 1000° C. or higher, being fused.

Moreover, the baking may be carried out by performing the heat treatment once or dividing the heat treatment into a first heat treatment of attaching the precursor to the surface of the porous body and a second heat treatment of heating in a temperature range of the treatment temperature of the first heat treatment to 700°. When the baking is carried out by performing the heat treatment step by step, the solid electrolyte layer 3 can be easily formed in a desired position.

Figure 4A:
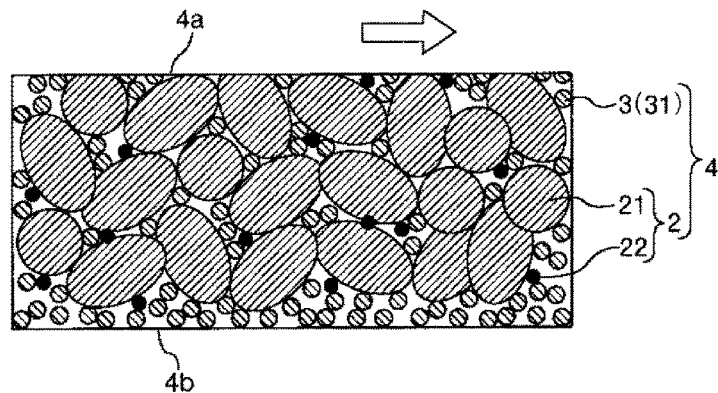
FIGS. 4A to 4C are views for describing the method of producing the lithium secondary battery illustrated in FIG. 1.

[3] Next, both of the active material molded body 2 and the solid electrolyte layer 3 are exposed from the one surface 4a by grinding and polishing the one surface 4a of the complex 4 (see FIG. 4A).

Further, in this case, scratch marks (grinding and polishing marks) which are traces of the grinding and polishing process remain on the one surface 4a.

Moreover, in the above-described process [2], both of the active material molded body 2 and the solid electrolyte layer 3 are occasionally exposed from the one surface 4a when the complex 4 is formed. In this case, the grinding and polishing process performed on the one surface 4a of the complex 4, that is, the present process [3] can be omitted.

Figure 4B:
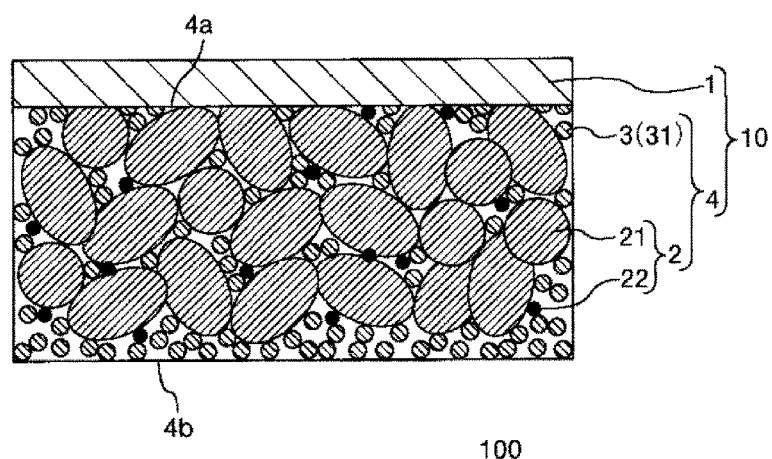

[4] Next, as illustrated in FIG. 4B, the current collector 1 is bonded to the one surface 4a of the complex 4 (third process).

In this manner, an electrode complex (the electrode complex according to the invention) 10 including the active material molded body 2, the solid electrolyte layer 3, and the current collector 1 is formed.

The bonding of the current collector 1 may be performed by bonding a current collector formed as a separate body to the one surface 4a of the complex 4 or may be performed by film-forming the forming material of the above-described current collector 1 on the one surface 4a of the complex 4 to form the current collector 1 on the one surface 4a of the complex 4.

Further, a film formation method of the current collector 1 can be performed using various physical vapor deposition (PVD) methods and chemical vapor deposition (CVD) methods.

In addition, the method of producing the electrode complex which produces the electrode complex 10 is configured of the above-described processes [1] to [4].

Figure 4C:
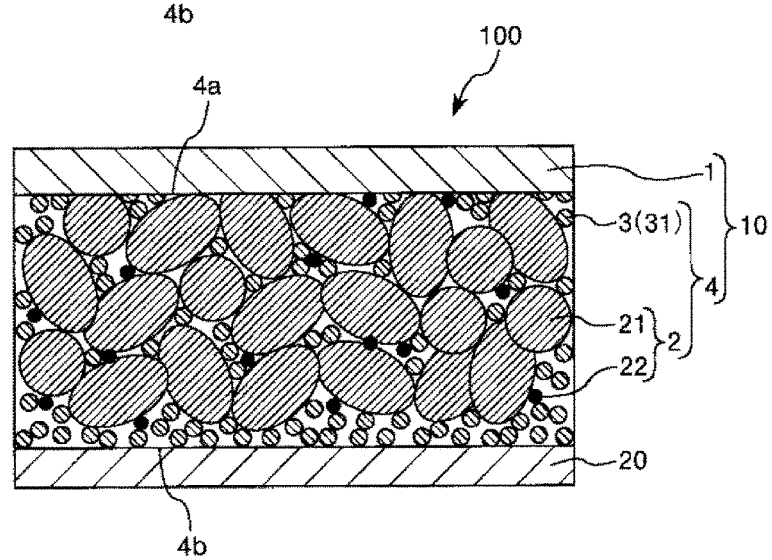

[5] Next, as illustrated in FIG. 4C, the electrode 20 is bonded to another surface 4b of the complex 4.

The bonding of the electrode 20 may be performed by bonding an electrode formed as a separate body to another surface 4b of the complex 4 or may be performed by film-forming the forming material of the above-described electrode 20 on another surface 4b of the complex 4 to form the electrode 20 on another surface 4b of the complex 4.

In addition, as the film forming method of the electrode 20, the same method as that of the film forming method of the current collector 1 in the above-described process [4] can be used.

The lithium secondary battery 100 is produced by performing the above-described processes.

Second Embodiment

Next, a second embodiment in which a lithium battery according to the invention is applied to a lithium secondary battery will be described.

Figure 6:
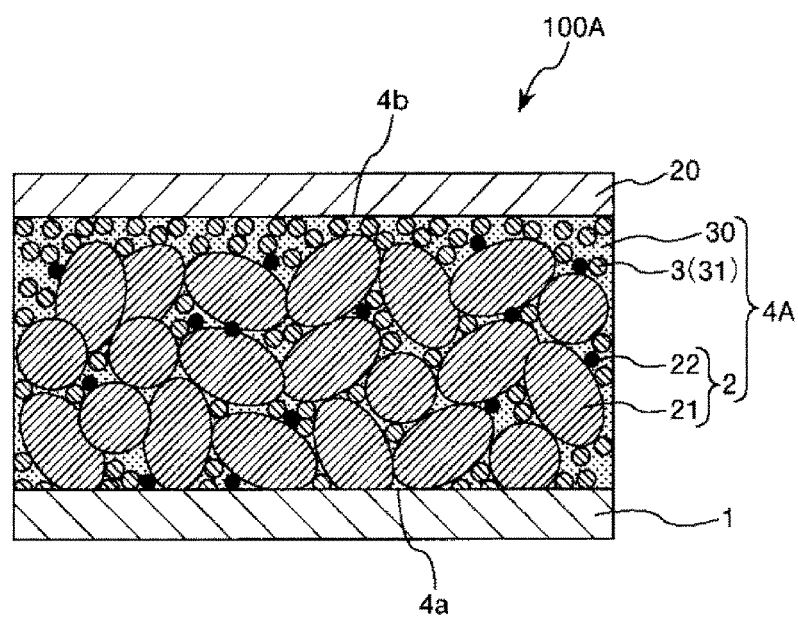
FIG. 6 is a longitudinal sectional view illustrating a second embodiment in which a lithium battery according to the invention is applied to a lithium secondary battery.

FIG. 6 is a longitudinal sectional view illustrating the second embodiment in which the lithium battery according to the invention is applied to the lithium secondary battery.

Hereinafter, in regard to a lithium secondary battery 100A of the second embodiment, the description will focus on the differences from the lithium secondary battery 100 of the first embodiment and the same matters will not be repeated.

The lithium secondary battery 100A illustrated in FIG. 6 is the same as the lithium secondary battery 100 illustrated in FIG. 1 except that a complex 4A whose configuration is different from that of the complex 4 is provided between the current collector 1 and the electrode 20 in a state of being bonded to the current collector 1 and the electrode 20.

That is, in the lithium secondary battery 100A of the second embodiment, the complex 4A includes an active material molded body 2 configured of a porous body having gaps; a solid electrolyte layer 3 provided in contact with the surface of the active material molded body 2 including the inside of gaps of the active material molded body 2; and a filling layer 30 filling the gaps remaining due to the formation of the solid electrolyte layer 3. In other words, the complex 4A further includes the filling layer 30 provided by filling the gaps remaining in the complex 4 of the first embodiment.

The filling layer (second solid electrolyte layer) 30 is formed of a solid electrolyte which conducts lithium ions and is amorphous (glassy) at room temperature. The filling layer 30 is formed of a lithium double oxide which has lithium ionic conductivity and contains Si or B. Specifically, the filling layer 30 may include at least one of $Li_2SiO_3$ and $Li_6SiO_5$.

The filling layer 30 can be formed using a method of impregnating remaining gaps with a precursor solution having fluidity of the filling layer 30, that is, a precursor solution of a solid electrolyte which is amorphous at room temperature and then heating the impregnated precursor solution.

In addition, it is preferable that a material which is a solid at room temperature (amorphous) and whose volumetric shrinkage at the time of burning a precursor is smaller than that of the solid electrolyte layer 3 is used as the filling layer 30. Further, it is preferable that the filling layer 30 can be formed at a temperature which is the same as or lower than that of the solid electrolyte layer 3. The reason therefor is that interdiffusion between the solid electrolyte layer 3 and the filling layer 30 needs to be prevented. For example, a case where $Li_{0.35}La_{0.55}TiO_3$ and $Li_2SiO_3$ are respectively used as the solid electrolyte layer 3 and the filling layer 30 is assumed. In this case, the baking temperature at the time of forming the solid electrolyte layer 3 is approximately 700° C. When the forming temperature at the time of forming the filling layer 30 exceeds 800° C., there is a concern that interdiffusion between the solid electrolyte layer 3 and the filling layer 30 is generated. In addition, as the precursor of the filling layer 30, any of (A) to (C) may be used similar to the precursor of the solid electrolyte layer 3. Any of (A) to (C) is diluted in a solvent (for example, an alcohol-based compound) to obtain a precursor solution. The remaining gaps are impregnated with the precursor solution. The method of impregnating the gaps with the precursor solution is the same as that described above in relation to the solid electrolyte layer 3.

In addition, the heating temperature for heating the precursor solution filling the gaps is set in the range of, for example, 300° C. to 450° C.

The same effects as those of the first embodiment can be obtained even by the lithium secondary battery 100A of the second embodiment.

Third Embodiment

Next, a third embodiment in which a lithium battery according to the invention is applied to a lithium secondary battery will be described.

Figure 7:
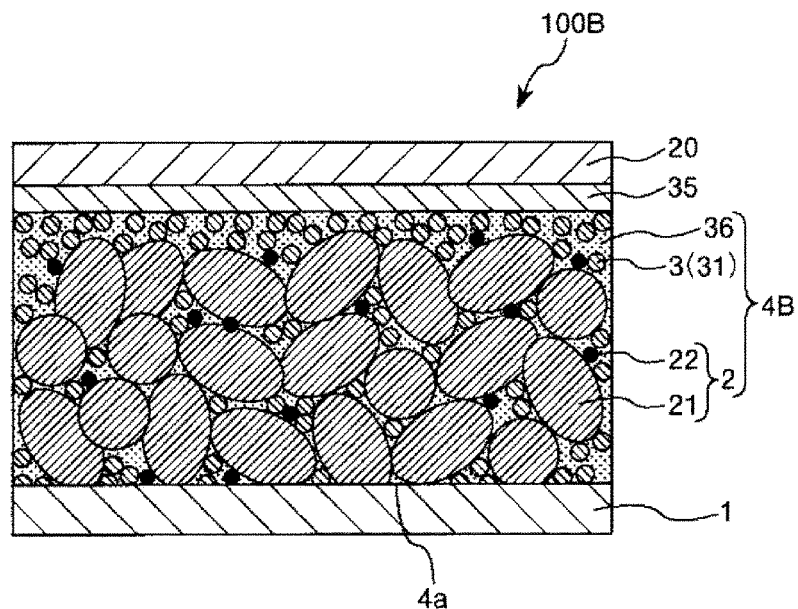
FIG. 7 is a longitudinal sectional view illustrating a third embodiment in which a lithium battery according to the invention is applied to a lithium secondary battery.

FIG. 7 is a longitudinal sectional view illustrating the third embodiment in which the lithium battery according to the invention is applied to the lithium secondary battery.

Hereinafter, in regard to a lithium secondary battery 100B of the third embodiment, the description will focus on the differences from the lithium secondary battery 100 of the first embodiment and the same matters will not be repeated.

The lithium secondary battery 100B illustrated in FIG. 7 is the same as the lithium secondary battery 100 illustrated in FIG. 1 except that a complex 4B whose configuration is different from that of the complex 4 is provided between the current collector 1 and the electrode 20 in a state of being bonded to the current collector 1 and the electrode 20.

That is, in the lithium secondary battery 100B of the third embodiment, the complex 4B includes an active material molded body 2 configured of a porous body having gaps; a solid electrolyte layer 3 provided in contact with the surface of the active material molded body 2 including the inside of gaps of the active material molded body 2; an electrolytic solution 36 filling remaining gaps by forming the solid electrolyte layer 3; and an electrolytic solution impregnation layer 35 provided between the solid electrolyte layer 3 and the electrode 20 in a state of being in contact with both of the solid electrolyte layer 3 and the electrode 20. In other words, the complex 4B further includes the electrolytic solution 36 provided by filling the remaining gaps of the complex 4 of the first embodiment and the electrolytic solution impregnation layer 35 provided between the complex 4 and the electrode 20.

In the complex 4B, the electrolytic solution impregnation layer 35 is provided between the complex 4 and the electrode 20 and the remaining gaps are filled with the electrolytic solution 36 by supplying the electrolytic solution 36 from the electrolytic solution impregnation layer 35 to the remaining gaps. In the gaps, this leads to a decrease in the contact area between the active material molded body 2 and the solid electrolyte layer 3, and a decrease in the ionic conductivity between the active material molded body 2 and the solid electrolyte layer 3 caused by an increase in resistance between the active material molded body 2 and the solid electrolyte layer 3 can be reliably prevented.

In addition, when a charging and discharging cycle is repeated in the lithium secondary battery, the volume of the active material molded body or the solid electrolyte layer fluctuates in some cases. On the contrary, in the present embodiment, even when the volume is contracted so that gaps are expanded, an electrolyte is further effused from the electrolytic solution impregnation layer 35 and the gaps are filled with the electrolytic solution 36. Meanwhile, even when the volume is expanded and the gaps become smaller, the electrolytic solution 36 of the gaps infiltrates into the electrolytic solution impregnation layer 35. In this manner, the gaps of the complex 4B become a buffering space of absorbing the volume fluctuation and thus the conduction path of the charge is secured. That is, a battery with a high output can be obtained.

In addition, since the amount of the electrolytic solution 36 (ion liquid in the electrolytic solution impregnation layer) is small and the electrolytic solution 36 is non-volatile, there is no concern of liquid leakage or combustion.

The electrolytic solution impregnation layer 35 is a film functioning as a lithium-resistant film or a supply source of a polymer-gel electrolyte. The electrolytic solution impregnation layer 35 is a film impregnated with an electrolytic solution conducting lithium ions. That is, the electrolytic solution impregnation layer 35 includes a support and a polymer-gel electrolyte (electrolytic solution).

The support physically supports the structure of the electrolytic solution impregnation layer 35 (PEG film). It is preferable that the support does not precipitate impurities, does not react with other materials such as a polymer-gel electrolyte, and has high wettability with an ionic liquid, Li salts, and monomers. When impurities are precipitated or a chemical reaction occurs, the characteristics may be changed. In addition, when the wettability is poor, polymers may not be uniformly formed in the support. Further, the strength can be improved by increasing the ratio of polymer components in the polymer-gel electrolyte without using the support, but it is preferable to use the support because the conductivity of Li is degraded when the ratio of the polymer components is increased. As the support, for example, long-fiber cellulose or hydrophobic polyvinylidene fluoride (PVDF) is used.

The polymer-gel electrolyte is required to have characteristics of being chemically stabilized with respect to Li and capable of incorporating an electrolytic solution after gelation. A normal polyethylene glycol (PEG)-based film is turned into a lithium-resistant reduction layer that suppresses reduction and a battery operation can be confirmed. However, in the PEG film, improvement in the ionic conductivity cannot be expected and a practical output as a battery cannot be obtained. In order to obtain a practical output as a battery, the conductivity of Li needs to be improved. In the present embodiment, a gel-polymer electrolyte in which an electrolytic solution is not volatilized is used.

Such a complex 4B can be formed using a method of attaching the electrolytic solution impregnation layer 35 to one surface of the complex, in which gaps remain, of the active material molded body 2 and the solid electrolyte layer 3 and supplying the electrolytic solution to the gaps from the electrolytic solution impregnation layer 35.

The electrolytic solution impregnation layer 35 is prepared by impregnating the support (base material) with a precursor solution containing an electrolytic solution and monomers and performing photopolymerization. The electrolytic solution contains an ionic liquid and lithium salts. As the ionic liquid, for example, P13-TFSI (N-methyl-N-propylpyrrolidinium bis(trifluoromethanesulfonyl)imide) is used. As the lithium salts, Li-TFSI (lithium N,N-bis(trifluoromethanesulfonyl)imide) is used. As the monomers, for example, polyethylene glycol diacrylate (TEGDA) is used. A PGE preparation solution is obtained by mixing a polymerization initiator and ethylene carbonate with the above-described electrolytic solution. As the polymerization initiator, for example, a radical photopolymerization initiator (such as IRGACURE 651 (manufactured by BASF Corporation) or 2,2-dimethoxy-1,2-diphenylethane-1-one) is used. The polymerization initiator is mixed at a mixing ratio of 6:1 in terms of the weight ratio. The ethylene carbonate is used as a forming material of a solid electrolyte interface (SEI). The SEI is a film that inactivates and stabilizes the surface of a Li electrode. The SEI is generated by a reductive decomposition reaction of an electrolytic solution and consumption of the charge is confirmed through the decomposition reaction of ethylene carbonate in the initial cycle. The ethylene carbonate is mixed at a mixing ratio 1. The support is impregnated with the PGE preparation solution. As the support, a hydrophobic PVDF membrane filter (manufactured by Merck Millipore) is used. A support impregnated with the PGE preparation solution is irradiated with light having a predetermined wavelength range (for example, UV light) and monomers are photopolymerized to form a polymer, thereby obtaining an electrolytic solution impregnation layer 35. An electrolytic solution contained in the electrolytic solution impregnation layer 35 fills remaining gaps and functions as the electrolytic solution 36.

The electrolytic solution contained in the electrolytic solution impregnation layer 35 has excellent wettability to a solid electrolyte ($Li_{0.35}La_{0.55}TiO_3$) and infiltrates into gaps remaining through the solid electrolyte layer 3. In this manner, the gaps are filled with the electrolyte 36.

The same effects as those of the first embodiment can be obtained even by the lithium secondary battery 100B of the third embodiment.

Hereinbefore, the electrode complex, the method of producing the electrode complex, and the lithium battery according to the invention have been described based on the embodiments of the accompanying drawings, but the invention is not limited thereto.

For example, the configurations of respective portions in the electrode complex and the lithium battery according to the invention can be substituted with optional configurations having the same functions. In addition, other optional constituent materials may be added to the invention. Further, the invention may be a combination of two or more optional configurations (characteristics) from among the above-described respective embodiments.

Moreover, the lithium battery according to the invention can be applied to a primary battery in addition to the lithium secondary battery described in the respective embodiments.

In addition, one or more optional processes may be added to the method of producing the electrode complex according to the invention.

EXAMPLES

Next, Examples of the invention will be described in detail.

1. Production of Active Material Molded Body

Example 1

A slurry is obtained by dissolving a binder with 10% by weight of PCC in dioxane, and 50% by weight of powdery $LiCoO_2$ (manufactured by Sigma-Aldrich Japan K.K., hereinafter, also referred to as "LCO") and 3% by weight of powdery palladium metal particles with respect to LCO are stirred and dispersed in the solvent.

The obtained slurry is dried in a state of being placed in a 10 mmφ die such that the solvent is volatilized, and sintered by applying a heat treatment at 1000° C. for 8 hours. In the heat treatment, the temperature rising rate is set to 3° C./min and the temperature falling rate is set to 3° C./min until the temperature becomes 500° C., and a porous active material molded body is prepared. The thickness of the obtained active material molded body is approximately 300 μm. Since the binder and the solvent are completely burned off through sintering, the content of metal particles becomes 6% by weight with respect to LCO powder.

Example 2

A porous active material molded body is prepared in the same manner as in Example 1 except that a binder with 10% by weight of PCC is dissolved in dioxane and 50% by weight of powdery LCO and 1.5% by weight of powdery palladium metal particles with respect to LCO are stirred and dispersed in the solvent. Since the binder and the solvent are completely burned off through sintering, the content of metal particles becomes 3% by weight with respect to LCO powder.

Comparative Example 1

A porous active material molded body is prepared in the same manner as in Example 1 except that the addition of palladium metal particles is omitted.

Comparative Example 2

A porous active material molded body is prepared in the same manner as in Example 2 except that the addition of palladium metal particles is omitted.

2. Evaluation of Active Material Molded Body 2.1 Observation on Section of Active Material Molded Body When respective sections of active material molded bodies of respective Examples are cut out and the cut sections are observed with an electron microscope, palladium metal particles are not aggregated and adhered to the inner and outer surfaces of communication holes included in the active material molded bodies so as to be dispersed in the inner and outer surfaces thereof.

Figure 8:
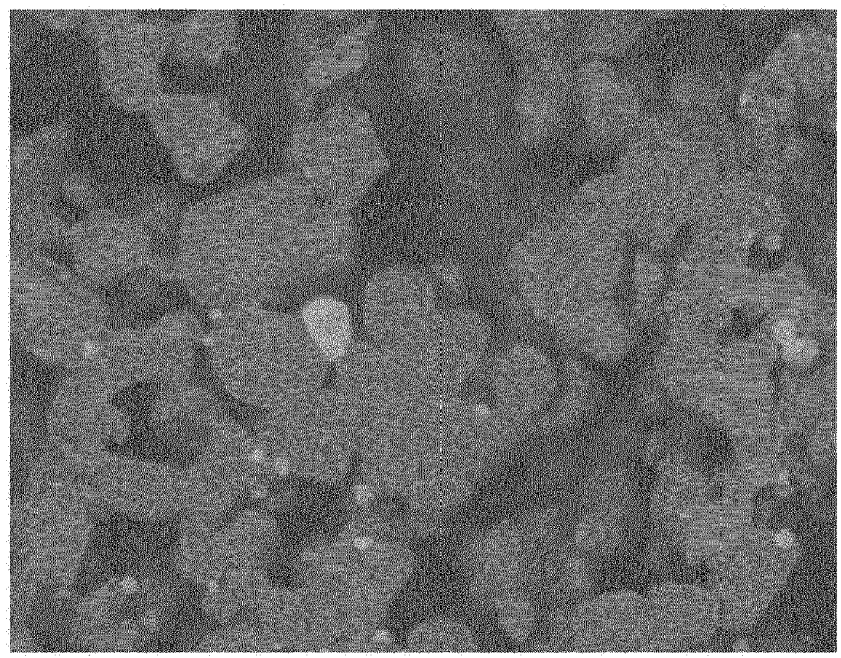
FIG. 8 is an electron micrograph of a section in an active material molded body of Example 1.

Moreover, for reference, FIG. 8 shows an electron micrograph of the section in the active material molded body of Example 1.

2.2 Analysis Using X-Ray Diffraction of Active Material Molded Body

In relation to the active material molded bodies of respective Examples, respective X-ray diffraction spectra are obtained.

When the compositions of the active material molded bodies of respective Examples are confirmed from the obtained X-ray diffraction spectra, the active material molded bodies are configured of LCO, different phases cannot be found, and compounds with palladium are not observed in all Examples.

2.3 Observation on Change in Resistance Value of Active Material Molded Body

In relation to the active material molded body of Comparative Example 1, the resistance value thereof is measured immediately after the production of the active material molded body and after one month from the production thereof.

In relation to the active material molded bodies of Examples 1 and 2 and Comparative Example 2, the resistance values thereof are measured immediately after the production of the active material molded bodies, after five days from the production thereof, and after one month from the production thereof.

Figure 9:
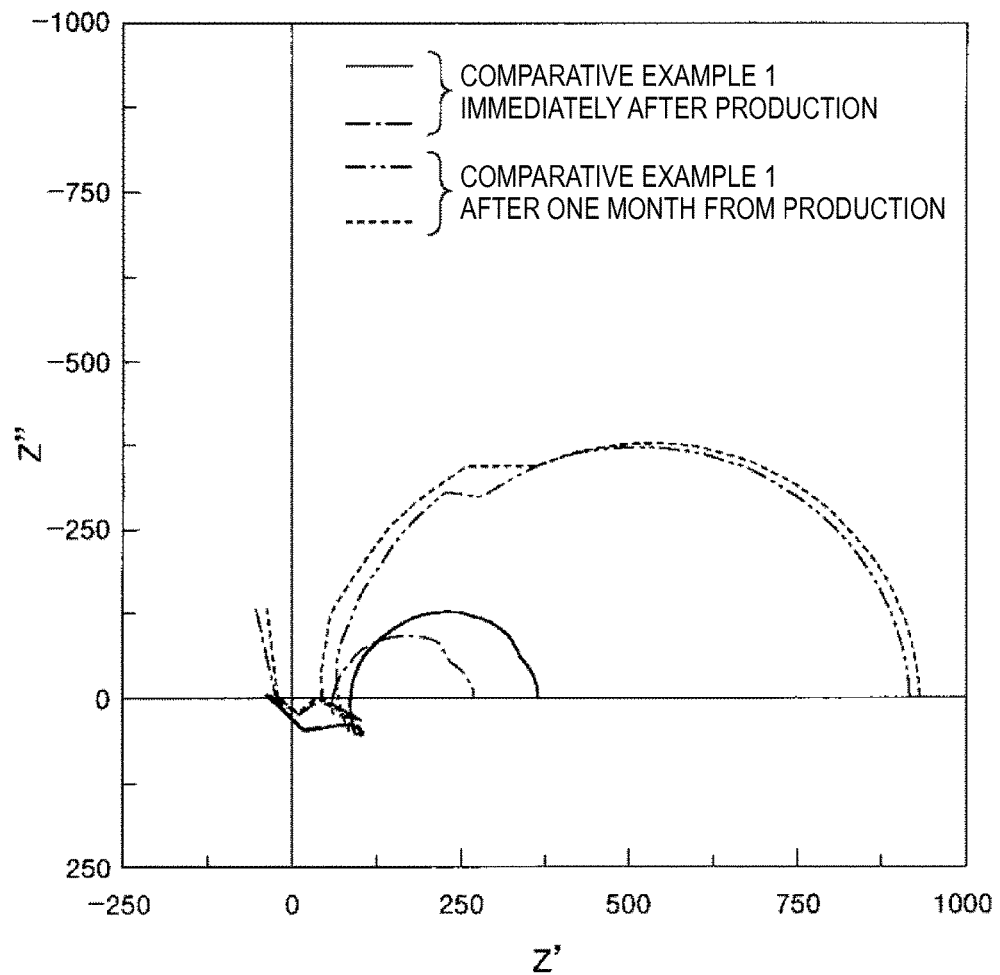
FIG. 9 is a graph showing a change in resistance values in an active material molded body of Comparative Example 1.
Figure 10:
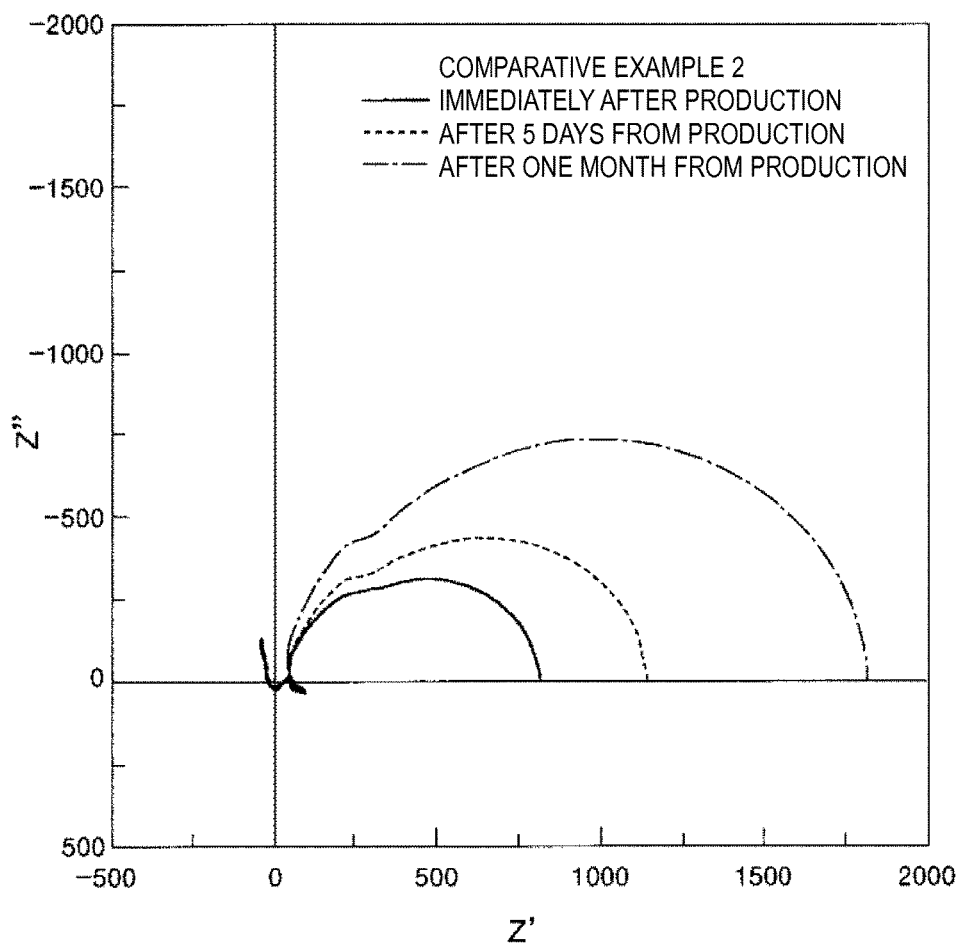
FIG. 10 is a graph showing a change in resistance values in an active material molded body of Comparative Example 2.
Figure 11:
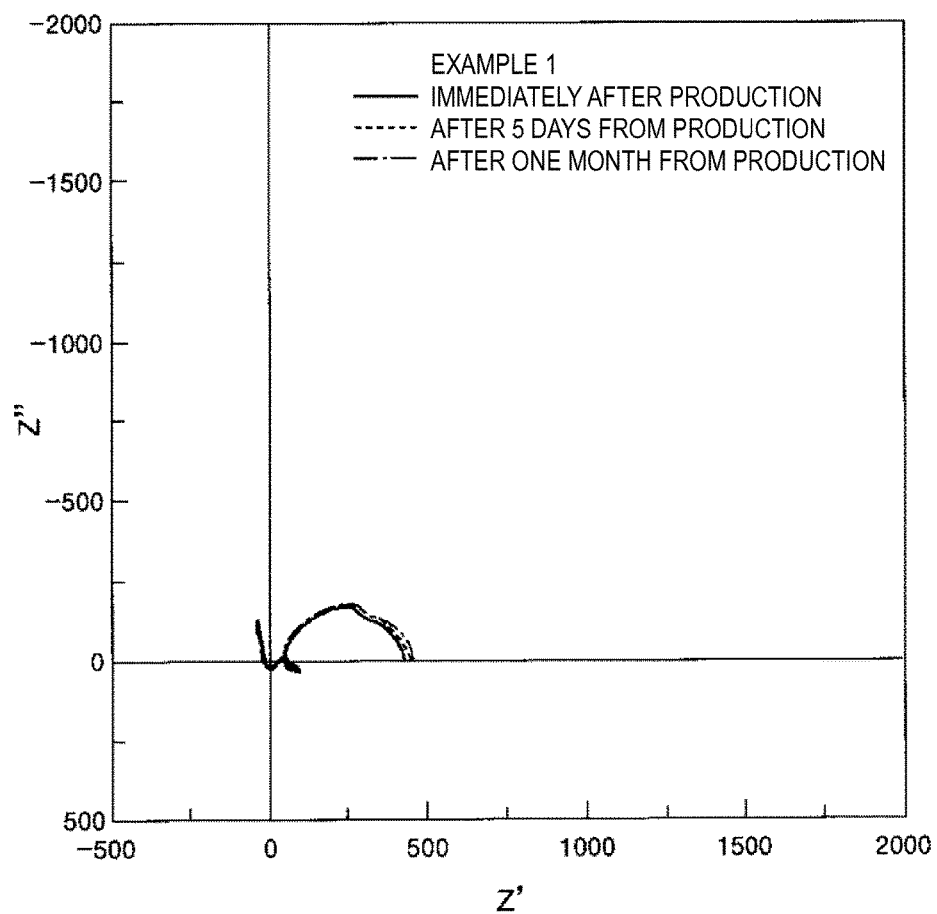
FIG. 11 is a graph showing a change in resistance values in the active material molded body of Example 1.
Figure 12:
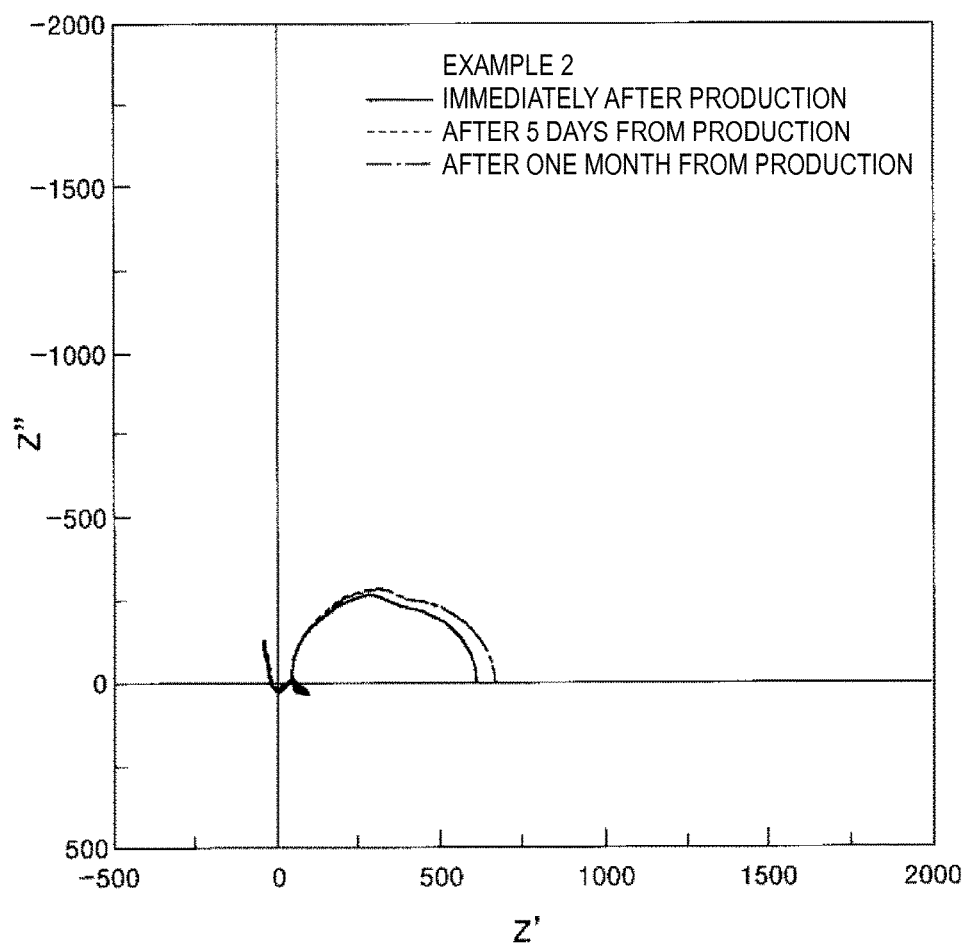
FIG. 12 is a graph showing a change in resistance values in an active material molded body of Example 2.

FIG. 9 shows a change in resistance values in the active material molded body of Comparative Example 1. FIG. 10 shows a change in resistance values in the active material molded body of Comparative Example 2. FIG. 11 shows a change in resistance values in the active material molded body of Example 1. FIG. 12 shows a change in resistance values in the active material molded body of Example 2.

As a result, while a change with time in resistance values is suppressed in respective Examples even after 1 month from the production, the resistance values become significantly larger as the time elapses, for example, immediately after the production, after 5 days from the production, or after 1 month from the production in respective Comparative Examples.

What is claimed is:

1. An electrode complex comprising:
   a comprising (i) a porous active material molded body including active material particles and noble metal particles, and (ii) a solid electrolyte layer formed on a surface of the active material molded body; and
   a current collector bonded to an active material molded particle exposed on a surface of the complex,
   wherein the active material particles include a lithium double oxide,
   the noble metal particles include a noble metal having a melting point of 1000° C. or higher, and the solid electrolyte layer includes a solid electrolyte, and
   a content of the noble metal particles in the active material molded body is in a range of 0.1% by weight to 10% by weight,
   wherein the active material molded body has a porosity in a range of 10% to 50%.

2. The electrode complex according to claim 1, wherein the active material molded body includes a communication hole, and the solid electrolyte layer is formed even in the communication hole.

3. The electrode complex according to claim 1, wherein the noble metal is at least one of palladium and platinum.

4. The electrode complex according to claim 1, wherein the noble metal particles have an average particle diameter of 0.1 µm to 10 µm.

5. The electrode complex according to claim 1, wherein the average particle diameter of the active material particles is greater than the average particle diameter of the noble metal particles.

6. The electrode complex according to claim 1, wherein the complex includes a first portion in which the active material molded body and the solid electrolyte layer are exposed and a second portion in which the solid electrolyte layer is singly exposed, and
the current collector is bonded to the first portion.

7. The electrode complex according to claim 1, wherein the lithium double oxide is $LiCoO_2$.

8. The electrode complex according to claim 1, wherein the solid electrolyte is $Li_{0.35}La_{0.55}TiO_3$.

9. The electrode complex according to claim 1, wherein the content of the noble metal particles in the active material molded body is in the range of 0.1% by weight to 10% by weight relative to a total amount of the noble metal particles and the active material particles.

10. A lithium battery comprising:
the electrode complex according to claim 6; and
an electrode which is bonded to the second portion.

11. An electrode complex comprising:
a porous active material molded body including active material particles and noble metal particles; and
an electrolyte layer formed on a surface of the active material molded body,
wherein the active material particles include a lithium double oxide,
the noble metal particles include a noble metal having a melting point of 1000° C. or higher, and
the electrolyte layer includes a first electrolyte that is formed on the surface of the active material molded body and a second electrolyte that is filled in a gap between the active material molded body and the first electrolyte, the second electrolyte including an amorphous electrolyte,
a content of the noble metal particles in the active material molded body is in a range of 0.1% by weight to 10% by weight,
wherein the active material molded body has a porosity in a range of 10% to 50%.

12. The electrode complex according to claim 11, wherein the second electrolyte includes Si or B.

13. An electrode complex comprising:
a porous active material molded body including active material particles and noble metal particles;
an electrolyte layer formed on a surface of the active material molded body; and
an electrolytic solution impregnation layer formed on a surface of the electrolyte layer,
wherein the active material particles include a lithium double oxide,
the noble metal particles include a noble metal having a melting point of 1000° C. or higher, and
the electrolyte layer includes a solid electrolyte that is formed on the surface of the active material molded body and an electrolytic solution that is filled in a gap between the active material molded body and the solid electrolyte,
a content of the noble metal particles in the active material molded body is in a range of 0.1% by weight to 10% by weight,
wherein the active material molded body has a porosity in a range of 10% to 50%.

14. A method of producing an electrode complex, comprising:
heating active material particles which contain a lithium double oxide and noble metal particles which contain a noble metal having a melting point of 1000° C. or higher to obtain a porous active material molded body to which a plurality of the active material particles and a plurality of the noble metal particles are connected;
applying and then heating a liquid material which contains a forming material of an inorganic solid electrolyte to obtain a complex in which a solid electrolyte layer is formed on the surface of the active material molded body; and
bonding a current collector to the active material molded body exposed to the surface of the complex,
wherein a content of the noble metal particles in the active material molded body is in a range of 0.1% by weight to 10% by weight,
wherein the active material molded body has a porosity in a range of 10% to 50%.

15. The method of producing an electrode complex according to claim 14, wherein the active material molded body includes a communication hole.

16. The method of producing an electrode complex according to claim 14, wherein the heating of the active material particles includes molding a mixture of the plurality of active material particles and the plurality of noble metal particles through compression and then heating the mixture.

17. The method of producing an electrode complex according to claim 14, wherein the heating of the active material particles includes heating a slurry formed by dispersing a mixture of the plurality of active material particles and the plurality of noble metal particles in a solvent.

18. The method of producing an electrode complex according to claim 14, wherein the heating of the active material particles is performed in a temperature range of 850° C. to lower than 1000° C.

* * * * *